US012767763B2

(12) United States Patent
Funahashi et al.

(10) Patent No.: US 12,767,763 B2
(45) Date of Patent: Oct. 20, 2026

(54) CROSSLINKED POLYARYLENE SULFIDE, COMPOSITION, AND METHOD FOR PRODUCING MOLDED ARTICLE

(71) Applicant: DIC Corporation, Tokyo (JP)

(72) Inventors: Chikara Funahashi, Ichihara (JP); Hideki Watanabe, Ichihara (JP); Takashi Furusawa, Ichihara (JP)

(73) Assignee: DIC Corporation, Tokyo (JP)

( * ) Notice: Subject to any disclaimer, the term of this patent is extended or adjusted under 35 U.S.C. 154(b) by 873 days.

(21) Appl. No.: 18/027,383

(22) PCT Filed: Aug. 26, 2021

(86) PCT No.: PCT/JP2021/031292

§ 371 (c)(1),
(2) Date: Jul. 21, 2023

(87) PCT Pub. No.: WO2022/070696

PCT Pub. Date: Apr. 7, 2022

(65) Prior Publication Data

US 2024/0043621 A1 Feb. 8, 2024

(30) Foreign Application Priority Data

Sep. 29, 2020 (JP) ................................ 2020-163202

(51) Int. Cl.

| | |
|---|---|
| ***C08J 3/12*** | (2006.01) |
| ***C08G 75/0295*** | (2016.01) |
| ***C08J 3/24*** | (2006.01) |

(52) U.S. Cl.

CPC ............ *C08G 75/0295* (2013.01); *C08J 3/12* (2013.01); *C08J 3/247* (2013.01); *C08J 2381/02* (2013.01)

(58) Field of Classification Search

CPC .... C08G 3/12; C08G 75/0204; C08J 2381/02; C08J 3/12; C08L 81/02

See application file for complete search history.

(56) References Cited

U.S. PATENT DOCUMENTS

| | | | |
|---|---|---|---|
| 3,354,129 A | 11/1967 | Edmonds, Jr. et al. | |
| 3,717,620 A | 2/1973 | Rohlfing | |
| 3,793,256 A | 2/1974 | Scoggin | |
| 4,286,018 A * | 8/1981 | Asakura ............. | G11B 5/73937 428/419 |

FOREIGN PATENT DOCUMENTS

| | | |
|---|---|---|
| JP | S62-177027 A | 8/1987 |
| JP | 04129704 A * | 4/1992 |
| JP | H04-248841 A | 9/1992 |

* cited by examiner

*Primary Examiner* — Margaret G Moore

(74) *Attorney, Agent, or Firm* — Troutman Pepper Locke LLP; James E. Armstrong, IV; Tanya Leavy

(57) ABSTRACT

A method for producing a crosslinked polyarylene sulfide resin (PAS resin) that reduces a difference in melt viscosity among lots and has excellent quality stability is provided. Further specifically, the method includes steps of compression-molding an uncrosslinked PAS resin in a powder form to obtain a compression-molded material, measuring a true specific gravity of the compression-molded material, grinding the compression-molded product having a specific range of true specific gravity to obtain a pulverized material, granulating the pulverized material to obtain a granulated material, and oxidatively crosslinking the granulated material obtained in the above step. Also provided are a method for producing a composition containing the crosslinked PAS, and a method for producing a molded article by melt-molding the composition.

6 Claims, No Drawings

CROSSLINKED POLYARYLENE SULFIDE, COMPOSITION, AND METHOD FOR PRODUCING MOLDED ARTICLE

TECHNICAL FIELD

The present invention relates to a method for producing a crosslinked polyarylene sulfide, a method for producing a composition containing the crosslinked polyarylene sulfide, and a method for producing a molded article by melt-molding the composition.

BACKGROUND ART

Among polyarylene sulfides (hereinafter referred to as PAS) typified by polyphenylene sulfides (hereinafter referred to as PPS) used in engineering plastics, and the like, a crosslinked PAS is used in which a granular PAS that is produced by solution polymerization is subjected to oxidative crosslinking until a melt flow rate (hereinafter referred to as MFR, which is measured at 316° C. under a load of 5 kg in a unit of g/10 minutes in accordance with ASTM D-1238-74) reaches a desired value. This oxidative crosslinking proceeds generally by heating a PAS in a solid phase state at a temperature equal to or lower than the melting point in an oxygen-containing atmosphere, or by heating a PAS in a molten state at a temperature equal to or higher than the melting point in an oxygen-containing atmosphere.

Examples of an oxidative crosslinking method include a method using a forced hot air circulation type drier (PTL 1), a method using a container-fixed heating mixer with a double spiral type agitator (PTL 2), a method using a fluidized bed (PTL 3), a method using a fluidized bed with a cyclone, and a method using a bag filter built-in fluidized bed (PTL 4).

The above methods handle a PAS in a powder form in common. This causes inhibition of heat transfer due to generation of a layer attached to an inner wall of a reactor, extension of crosslinking time, uneven properties of a product, a decrease in collection rate and productivity due to generation of dust during preparation or taking out, and deterioration of workability. A method for producing a crosslinked PAS in which a granulated material of uncrosslinked PAS that is obtained by compression and granulation of a powdered PAS and has a bulk density of 0.4 g/cm 3 or more is heated in an oxygen-containing atmosphere resulting in oxidative crosslinking (referred to as conventional method) is proposed (PTL 5).

CITATION LIST

Patent Literature

PTL 1: U.S. Pat. No. 3,354,129

PTL 2: U.S. Pat. No. 3,717,620

PTL 3: U.S. Pat. No. 3,793,256

PTL 4: Japanese Unexamined Patent Application No. 62-177027

PTL 5: Japanese Unexamined Patent Application No. 4-248841

SUMMARY OF INVENTION

Technical Problem

However, the conventional method makes a large difference in melt viscosity among lots, and obviously has room for improvement in quality stability.

An object of the present invention is to provide a method for producing a crosslinked PAS that reduces a difference in melt viscosity among lots and has excellent quality stability. Furthermore, another object of the present invention is to provide a method for producing a composition containing the crosslinked PAS, and a method for producing a molded article by melt-molding the composition.

Solution to Problem

The inventors of the present application have made extensive investigations. Since the conventional method is a method for oxidatively crosslinking an uncrosslinked granulated material that is adjusted such that a bulk density is within a specific range, the inventors have found that a true specific gravity varies depending on the particle shape of the granulated material having the same bulk density, and as a result, a difference in melt viscosity among lots may be made, and that when the true specific gravity of the uncrosslinked granulated material is within a constant range, a crosslinked PAS having a reduced difference in melt viscosity among lots and excellent quality stability is obtained. Thus, the present invention has been completed.

Specifically, the present invention provides a method for producing a crosslinked polyarylene sulfide including steps of: compression-molding an uncrosslinked polyarylene sulfide in a powder form to obtain a compression-molded material; measuring a true specific gravity of the compression-molded material; grinding the compression-molded product having a specific range of true specific gravity to obtain a pulverized material; granulating the pulverized material to obtain a granulated material; and oxidatively crosslinking the granulated material obtained in the above step.

Furthermore, the present invention provides a method for producing a resin composition including steps of: producing a crosslinked polyarylene sulfide by the production method; and melt-kneading the obtained crosslinked polyarylene sulfide with another component.

Furthermore, the present invention provides a method for producing a molded article including steps of: producing a resin composition by the production method; and melt-molding the obtained resin composition.

Advantageous Effects of Invention

The present invention can provide a method for producing crosslinked PAS that reduces a difference in melt viscosity among lots and has excellent quality stability. Furthermore, the present invention can provide a method for producing a composition containing the crosslinked PAS, and a method for producing a molded article by melt-molding the composition.

DESCRIPTION OF EMBODIMENTS

A method for producing a crosslinked polyarylene sulfide of the present invention includes steps of: compression-molding an uncrosslinked polyarylene sulfide in a powder form to obtain a compression-molded material; measuring a true specific gravity of the compression-molded material; grinding the compression-molded product having a specific range of true specific gravity to obtain a pulverized material; granulating the pulverized material to obtain a granulated material; and oxidatively crosslinking the granulated material obtained in the above step.

For example, the uncrosslinked PAS in a powder form is usually synthesized by a reaction of at least one type of polyhaloaromatic compound with at least one type of sulfide-forming agent in an organic polar solvent typified by N-methyl-2-pyrrolidone and the like under an appropriate polymerization condition.

The polyhaloaromatic compound used in the present invention is a halogenated aromatic compound having two or more halogen atoms directly bonded to an aromatic ring. Specific examples thereof include dihaloaromatic compounds such as p-diclorobenzene, o-diclorobenzene, m-diclorobenzene, trichlorobenzene, tetrachlorobenzene, dibromobenzene, diiodobenzene, tribromobenzene, dibromonaphthalene, triiodobenzene, diclorodiphenylbenzene, dibromodiphenylbenzene, dichlorobenzophenone, dibromobenzophenone, dichloro diphenyl ether, dibromo diphenyl ether, dichloro diphenyl sulfide, dibromo diphenyl sulfide, dichlorobiphenyl, dibromobiphenyl, and a mixture thereof. The compounds may be block-copolymerized. In particular, dihalogenated benzenes are preferable, and a compound containing 80% by mole or more of p-diclorobenzene is particularly preferable.

In order to increase the viscosity of polyarylene sulfide due to a branched structure, a polyhaloaromatic compound having 3 or more halogen substituents in the molecule may be used as a branching agent, as desired. Examples of such a polyhaloaromatic compound include 1,2,4-trichlorobenzene, 1,3,5-trichlorobenzene, and 1,4,6-trichlorolnaphthalene.

Furthermore, examples thereof include polyhaloaromatic compounds having active hydrogen-containing functional groups such as an amino group, a thiol group, and a hydroxyl group. Specific examples thereof include dihaloanilines such as 2,6-dichloroaniline, 2,5-dichloroaniline, 2,4-dichloroaniline, and 2,3-dichloroaniline; trihaloanilines such as 2,3,4-trichloroaniline, 2,3,5-trichloroaniline, 2,4,6-trichloroaniline, and 3,4,5-trichloroaniline; dihaloamino diphenyl ethers such as 2,2'-diamino-4,4'-dichloro diphenyl ether, and 2,4'-diamino-2',4-dichloro diphenyl ether; a mixtures thereof; and compounds in which the amino group in the aforementioned compounds is substituted by a thiol group or a hydroxyl group.

An active hydrogen-containing polyhaloaromatic compound in which a hydrogen atom bonded to a carbon atom forming an aromatic ring in the active hydrogen-containing polyhaloaromatic compounds is substituted by another inactive group, for example, a hydrocarbon group such as an alkyl group can also be used.

Among these various active hydrogen-containing polyhaloaromatic compounds, an active hydrogen-containing dihaloaromatic compound is preferable, and dichloroaniline is particularly preferable.

Examples of a polyhaloaromatic compound having a nitro group include mono- or dihalonitrobenzenes such as 2,4-dinitrochlorobenzene, and 2,5-dichloronitrobenzene; dihalonitro diphenyl ethers such as 2-nitro-4,4'-dichloro diphenyl ether; dihalonitrodiphenyl sulfones such as 3,3'-dinitro-4,4'-dichlorodiphenyl sulfone; mono- or dihalonitropyridines such as 2,5-dichloro-3-nitropyridine, and 2-chloro-3,5-dinitropyridine; and various dihalonitronaphthalenes.

The sulfide-forming agent used in the present invention contains an alkali metal sulfide such as lithium sulfide, sodium sulfide, rubidium sulfide, cesium sulfide, or a mixture thereof. Such an alkali metal sulfide can be used in a hydrate, aqueous mixture, or anhydride form. The alkali metal sulfide can be obtained by a reaction of an alkali metal hydrosulfide with an alkali metal hydroxide.

For a reaction of a trace amount of alkali metal hydrosulfide or alkali metal thiosulfate present in the alkali metal sulfide, a small amount of alkali metal hydroxide may be usually added.

Examples of the organic polar solvent used in the present invention include N-methyl-2-pyrrolidone, amides such as formamide, acetamide, N-methylformamide, and N,N-dimethylacetamide, amide ureas such as N-methyl-ε-caprolactam, ε-caprolactam, hexamethyl phosphoramide, tetramethyl urea, N-dimethylpropylene urea, and 1,3-dimethyl-2-imidazolidinone, and lactams; sulfolanes such as sulfolane, and dimethyl sulfolane; nitriles such as benzonitrile; ketones such as methyl phenyl ketone; and a mixture thereof.

As the polymerization condition of the sulfide-forming agent with the polyhaloaromatic compound in the presence of the organic polar solvent, a temperature is generally 200 to 330° C., and a pressure is within such a range that the polymerization solvent and the polyhaloaromatic compound that is a polymerization monomer are substantially held in a liquid phase, and is generally selected from the range of 0.1 to 20 MPa, and preferably 0.1 to 2 MPa. A reaction time varies depending on the temperature and the pressure, and is generally 10 minutes to 72 hours, and desirably 1 hour to 48 hours.

The granular uncrosslinked PAS used in the present invention includes an aspect obtained by a reaction in the presence of the sulfide-forming agent and the organic polar solvent under continuous or intermittent addition of the polyhaloaromatic compound and the organic polar solvent, and an aspect obtained by a reaction in the presence of the polyhaloaromatic compound and the organic polar solvent under continuous or intermittent addition of the sulfide-forming agent.

The granular uncrosslinked PAS used in the present invention can be produced, for example, by post-treatment of the PAS or a reaction mixture including the PAS obtained by the polymerization method.

The post-treatment of the reaction mixture containing the PAS obtained by the polymerization method is not particularly limited. Examples of a step of washing a by-product contained in a polymerization reactant after polymerization of the PAS (an inevitable component derived from the polymerization reaction of the PAS) (hereinafter sometimes simply referred to as "washing step") include the following methods (1) to (6).

(1) A method in which after completion of the polymerization reaction, the solvent is distilled off under reduced pressure or normal pressure from the reaction mixture as it is or after addition of an acid or a base, a solid material after distillation of the solvent is washed with a solvent such as water, the reaction solvent (or an organic solvent having the same solubility in a low molecular weight polymer), acetone, methyl ethyl ketone, and an alcohol, one or two or more times, followed by neutralization, water-washing, and filtration, and if necessary, a dispersion medium is added to obtain a dispersion liquid.

(2) A method in which after completion of the polymerization reaction, a solvent (a solvent that is soluble in the polymerization solvent used and is a poor solvent to at least the PAS) such as water, acetone, methyl ethyl ketone, an alcohol, an ether, a halogenated hydrocarbon, an aromatic hydrocarbon, and an aliphatic hydrocarbon is added as a precipitating agent to the reaction mixture, to precipitate the PAS and a solid product such as an inorganic salt, to wash and filter off them, and if necessary, a dispersion medium is added to obtain a dispersion liquid.

(3) A method in which after completion of the polymerization reaction, a reaction solvent (or an organic solvent having the same solubility in a low molecular weight polymer) is added to the reaction mixture and stirred, and then, the low molecular weight polymer is removed by filtration, the resultant is washed with a solvent such as water, acetone, methyl ethyl ketone, and an alcohol one or two or more times, followed by neutralization, water-washing, and filtration, and if necessary, a dispersion medium is added to obtain a dispersion liquid.

(4) A method in which after completion of the polymerization reaction, water is added to the reaction mixture, followed by water-washing and filtration, and if necessary, an acid is added to treat the reaction mixture with the acid during water-washing, and furthermore, if necessary, a dispersion medium is added to obtain a dispersion liquid.

(5) A method in which after completion of the polymerization reaction, the reaction mixture is filtered, and if necessary, washed one or two or more times with the reaction solvent, followed by water-washing and filtration, and if necessary, a dispersion medium is added to obtain a dispersion liquid.

(6) A method in which after completion of the polymerization reaction, the reaction mixture is desolventized, to obtain a slurry containing the PAS, the slurry containing the PAS is brought into contact with water and an oxygen atom-containing solvent having 1 to 10 carbon atoms to convert the PAS into porous particles, the obtained porous particles are washed with carbonated water and filtered, and if necessary, a dispersion medium is added to obtain a dispersion liquid. Examples of the oxygen atom-containing solvent having 1 to 10 carbon atoms include at least one selected from the group consisting of alcohols and ketones. Examples of the alcohols (also referred to as alcohol-based solvent or alcohol solvent) include alcohols having 10 or less carbon atoms such as methyl alcohol, ethyl alcohol, n-propyl alcohol, isopropyl alcohol, n-butyl alcohol, isobutyl alcohol, t-butyl alcohol, ethylene glycol, propylene glycol, trimethylolpropane, and benzyl alcohol; alcohols having 10 or less carbon atoms and an ether bond such as 2-methoxyethyl alcohol, 2-ethoxyethyl alcohol, 1-methoxy-2-propyl alcohol, 1-ethoxy-2-propyl alcohol, 3-methoxy-1-butyl alcohol, and 2-isopropoxyethyl alcohol; alcohols having 10 or less carbon atoms and a ketone group such as 3-hydroxy-2-butanone; and alcohols having 10 or less carbon atoms and an ester group such as methyl hydroxyisobutyrate. Examples of the ketones (also referred to as ketone-based solvent or ketone solvent) include acetone, methyl ethyl ketone, cyclohexanone, y-butyl lactone, and N-methyl pyrrolidinone. In the present invention, it is preferable that a monohydric alcohol having 10 or less carbon atoms be used since the remaining carboxylalkylamino group-containing compound can be efficiently removed. Furthermore, a monohydric alcohol having 3 or less carbon atoms is preferable.

After the post-treatments by the methods (1) to (6), the dispersion liquid can be powdered by drying.

The melt viscosity of the uncrosslinked PAS in a powder form used in the present invention is not particularly limited. The melt viscosity (V6) measured at 300° C. is preferably 1 Pa·s or more, more preferably 3 Pa·s or more, and further preferably 5 Pa·s or more, and preferably 800 Pa·s or less, more preferably 500 Pa·s or less, and further preferably 200 Pa·s or less.

The non-Newtonian index of the uncrosslinked PAS in a powder form used in the present invention is not particularly limited. The non-Newtonian index is preferably or more, and more preferably 0.95 or more, and preferably 1.25 or less, and more preferably 1.20 or less.

Herein, the melt viscosity (V6) measured at 300° C. represents a melt viscosity after the PAS is held at a temperature of 300° C. under a load of 1.96 MPa for six minutes using an orifice having a ratio of an orifice length to an orifice diameter of 10/1 by a flow tester. The non-Newtonian index (N value) is a value calculated by the following expression from a shear rate and a shear stress that are measured using Capilograph under conditions of 300° C. and a ratio of an orifice length (L) to an orifice diameter (D), L/D, of 40.

$$SR=K\cdot SS^N \quad \text{[Equation 1]}$$

(SR represents a shear rate ($s^{-1}$), SS represents a shear stress ($dyn/cm^2$), and K is a constant.) As the N value is closer to 1, the PAS is closer to a linear shape. As the N value is higher, the structure is more crosslinked.

The particle diameter of the uncrosslinked PAS in a powder form used in the present invention is not particularly limited. The average particle diameter obtained by SEM observation is preferably 1 μm or more, more preferably 5 μm or more, and further preferably 20 μm or more, and preferably 500 μm or less, more preferably 400 μm or less, and further preferably 300 μm or less.

The present invention includes the steps of compression-molding the uncrosslinked polyarylene sulfide in a powder form that is thus obtained to obtain a compression-molded material, and measuring the true specific gravity of the compression-molded material.

Examples of compression-molding include a method in which the uncrosslinked PAS in a powder form is mechanically compression-molded in an unmolten state. In the compression-molding step, various methods can be adopted, and the step is not particularly limited. From the viewpoint of stability of production of the compressed material, it is particularly desirable that, specifically, by a method in which the uncrosslinked PAS in a powder form is introduced between two rotatable press rolls configured to be engaged with each other, the uncrosslinked PAS in a powder form be placed between the rolls, transferred, and compressed at high density into a plate shape.

A method for measuring the true specific gravity of the obtained compression-molded material is not particularly limited. The true specific gravity can be measured by Archimedes method. For example, a method described in Examples can be used.

The present invention includes the step of grinding the compression-molded material having a specific range of true specific gravity to obtain a pulverized material. That is, the step is a step in which the compression-molded material measured in the step and having a specific range of true specific gravity is selected and ground to obtain the pulverized material.

The specific range of true specific gravity is not particularly limited. For example, the true specific gravity is preferably 1.00 or more. From the viewpoint of reducing the amount of fine powder, the true specific gravity is preferably 1.10 or more, and preferably 1.30 or less, and more preferably 1.20 or less. From the viewpoint of efficiently promoting a crosslinking reaction and achieving excellent productivity, the true specific gravity is further preferably 1.15 or less.

The step of obtaining the compression-molded material, the step of measuring the true specific gravity, and the step of obtaining the pulverized material can be continuously performed. In this case, the steps can be performed while the true specific gravity of the compression-molded material is adjusted.

The true specific gravity of the compression-molded material can be adjusted by adjusting a compression pressure during compression-molding. In the specific example, the true specific gravity of the plate-shaped compression-molded material can be adjusted by adjusting the distance between the two press rolls.

Specifically, as a method for pulverizing the compression-molded material, various methods can be adopted. The method is not particularly limited. Examples thereof include a method using a roll crusher in which at least two rolls are rotated so as to engage with each other, and the compression-molded material is ground between the rolls mainly by a compression force and partially by a shear force, a method using a cutter mill in which the compression-molded material is ground while a rotor provided with a cutter or the like is rotated, a method using a stamp mill in which the compression-molded material is pulverized by impact caused by dropping a mortar-shaped striking bar, and a method using a stone mortar in which the compression-molded material is ground by a shear force caused when the compression-molded material is passed through a gap between two rubstones, an upper rubstone and a lower rubstone. The shape of the ground material is not particularly limited, and examples thereof include amorphous flakes and chips.

The present invention includes the step of granulating the pulverized material that is thus obtained to obtain a granulated material.

Specifically, as a method for granulating the pulverized material, various methods can be adopted. The method is not particularly limited. Examples thereof include a method for passing the pulverized material through a physical hole to appropriately regulate the size and the shape, such as a sieve, a filter, and a punching metal.

During compression-molding, grinding, and granulating the uncrosslinked PAS in a powder form, a partially crosslinked PAS may be mixed, if necessary.

The true specific gravity is preferably 1.00 or more. This is because the true specific gravity of the granulated material that is thus obtained is equal to the true specific gravity of the compression-molded material before pulverization, the granulated material is unlikely to collapse, and crosslinking can be promoted without inhibiting oxygen supply. From the viewpoint of reducing the amount of fine powder, the true specific gravity is more preferably 1.10 or more, and preferably 1.30 or less, and more preferably 1.20 or less. From the viewpoint of efficiently promoting a crosslinking reaction and achieving excellent productivity, the true specific gravity is further preferably 1.15 or less.

In the present invention, when the true specific gravity of the compression-molded material of the uncrosslinked PAS for oxidative crosslinking is adjusted as described above, a crosslinked PAS that has a homogeneous gap, a reduced difference among lots, and excellent quality stability is obtained regardless of the particle shape of the granulated material.

From the viewpoint of suitability for oxidative crosslinking and subsequent melting and extrusion molding, the shape of the granulated material may be amorphous. Amorphousness may be any shape such as a particle shape, a plate shape, a cylinder, or a needle shape. It is preferable that the amorphousness satisfy a ratio of the shortest distance to the diameter of 0.5 or more when any 20 granulated materials are extracted in a two-dimensional image photographed by electrophotography (magnification: 10 times), the shortest diameter is the shortest size of each of the granulated materials, and the diameter is a diameter corresponding to a circle.

The present invention includes the step of oxidatively crosslinking the granulated material that is thus obtained. Oxidative crosslinking is not particularly limited as long as it is a publicly known method. Examples of the method include a method in which the granulated material is subjected to a heating treatment in an oxidative atmosphere such as air or oxygen rich air. From the viewpoint of improving a time required for the heating treatment and heat-stability during melting of the PAS after the heating treatment, a heating condition is preferably a temperature range of 180° C. or higher and a temperature lower than the melting point of the PAS by 20° C. Herein, the melting point is measured with a differential scanning calorimeter (DSC device Pyris Diamond manufactured by PerkinElmer Co., Ltd.) in accordance with JIS K 7121.

From the viewpoint of increasing the oxidation rate and shortening a treatment time, the oxygen concentration in the heating treatment in an oxidative atmosphere such as air or oxygen rich air is preferably 5% by volume or more, and more preferably 10% by mass or more. From the viewpoint of suppressing an increase in the amount of generated radical, suppressing an increase in tackiness during the heating treatment, and achieving favorable hue, the oxygen concentration may be preferably 30% by volume or less, and more preferably 25% by volume or less.

The non-Newtonian index of the crosslinked PAS used in the present invention that is thus obtained is not particularly limited. For example, the non-Newtonian index may be preferably 1.26 or more, more preferably 1.30 or more, and further preferably 1.35 or more, and preferably 2.00 or less, more preferably 1.95 or less, and further preferably 1.90 or less.

The melt viscosity of the crosslinked PAS in the present invention is not particularly limited. For example, the melt viscosity (V6) measured at 300° C. may be preferably 20 Pa·s or more, and more preferably 100 Pa·s or more, and preferably 5,000 Pa·s or less, and more preferably 2,000 Pa·s or less.

Even when the granulated material of the uncrosslinked PAS is oxidatively crosslinked, the shape thereof is hardly changed. Thus, the true specific gravity, the maximum particle diameter, and the circularity are the same as those described above.

The crosslinked PAS in the present invention as described above can be processed into a molded article having excellent heat resistance, molding workability, and dimensional stability by various melt processing methods such as injection molding, extrusion molding, compression molding, and blow molding.

In order to further improve performances such as strength, heat resistance, and dimensional stability, the crosslinked PAS in the present invention can be used as a PAS resin composition containing various types of fillers. The fillers are not particularly limited, and examples of the fillers include fibrous fillers and inorganic fillers. As the fibrous fillers, natural fibers such as glass fibers, carbon fibers, silane glass fibers, ceramic fibers, aramid fibers, metal fibers, fibers of potassium titanate, silicon carbide, calcium sulfate, or calcium silicate, or wollastonite can be used. As the inorganic fillers, barium sulfate, calcium sulfate, clay, pyrophyllite, bentonite, sericite, zeolite, mica, mica, talc, attapulgite, ferrite, calcium silicate, calcium carbonate, magnesium carbonate, glass beads, or the like, can be used. As an additive for molding processing, various types of additives such as a release agent, a colorant, a heat-resistant stabilizer, an ultraviolet stabilizer, a foaming agent, an anti-rust agent, a flame retarder, and a lubricant can be contained.

The crosslinked PAS obtained by the present invention may be appropriately used, according to application, as a PAS resin composition in which a synthetic resin such as a polyester, a polyamide, a polyimide, a polyetherimide, a polycarbonate, a polyphenylene ether, a polysulfone, a polyether sulfone, a polyether ether ketone, a polyether ketone, a polyarylene, a polyethylene, a polypropylene, a poly(ethylene tetrafluoride), a poly(ethylene difluoride), a polystyrene, an ABS resin, an epoxy resin, a silicone resin, a phenol resin, a urethane resin, or a liquid crystal polymer, or an elastomer such as polyolefine-based rubber, fluororubber, or silicone rubber is mixed.

Since the crosslinked PAS obtained by the method of the present invention includes various performances such as heat resistance and dimensional stability that are originally possessed by a PAS resin, the crosslinked PAS is widely used, for example, for electric and electronic parts such as a connector, a printed circuit board, and a sealing molded article, automobile parts such as a lamp reflector and various electrical components, various architectures, interior materials of an airplane and an automobile, materials for various molding processing, such as materials for injection molding or compression molding such as precision parts including office automation equipment, a camera part, and a watch part, materials for extrusion molding such as a composite, a sheet, and a pipe, and materials for drawing molding, and materials for fibers and films. In particular, the crosslinked PAS resin in the present invention has short crystallization time, is useful in using as a material for injection molding, and improves releasability, and can shorten a molding cycle. Therefore, molding workability and molding efficiency can be improved.

EXAMPLES

Hereinafter, the present invention will be described specifically using Examples. The examples are illustrative, and are not limited.

[Synthesis Example] Production of Unclosslinked PPS Resin

In a 150-L autoclave with a stirrer blade equipped with a pressure gauge, a thermometer, a condenser, a decanter, and a rectification tower, 33.222 kg (226 mol) of p-dichlorobenzene (hereinafter, abbreviated as p-DCB), 2.280 kg (23 mol) of N-methyl-2-pyrrolidone (hereinafter abbreviated as NMP), 27.300 kg (230 mol) of 47.23% by mass sodium hydrosulfide, and 18.533 kg (228 mol) of 49.21% by mass caustic soda were placed. Subsequently, a valve of a pipe from the autoclave to a distillation device was opened to start dehydration, and a valve of a pipe to an evacuator was also opened to decrease a pressure from atmospheric pressure to 47 kPa abs at a rate of −6.6 kPa abs/min. Furthermore, the liquid temperature was gradually heated from 128° C. to 147° C. at a rate of 0.1° C./min. Finally, dehydration was performed at a pressure 47 kPa abs and a liquid temperature of 147° C. for 4 hours. The mixed vapor of water and p-DCB discharged from the rectification tower was condensed by the condenser, and separated into water and p-DCB by the decanter, water is distilled outside the system, and p-DCB was brought back to the autoclave. The p-DCB distilled by azeotropy during the dehydration was separated by the decanter, and at any time, was brought back to the autoclave. In the autoclave after completion of the dehydration, an anhydrous sodium sulfide composition was dispersed in p-DCB. Furthermore, the inner temperature was cooled to 160° C., 47.492 kg (479 mol) of NMP was added, and the inner temperature was heated to 185° C. When the pressure reached 0.00 MPa, a valve connected to the rectification tower was opened, and the inner temperature was heated to 200° C. over one hour. At that time, the outlet temperature of the rectification tower was controlled to be 110° C. or lower by cooling and a valve opening degree. The mixed vapor of distilled p-DCB and water was condensed by the condenser, and separated by the decanter, and the p-DCB was brought back to the autoclave. The amount of distilled water was 179 G. Subsequently, the inner temperature was heated from 200° C. to 230° C. over three hours, stirred for one hour, heated to 250° C., and stirred for one hour. After completion of a reaction, the inner temperature of the autoclave was cooled from 250° C. to 235° C. After the inner temperature reached 235° C., a bottom valve of the autoclave was opened, a 150-L vacuum stirring drying device with a stirrer blade (desolvation device jacket temperature: 120° C.) was flushed under reduced pressure to remove NMP, and a content was cooled to room temperature, and sampled. As a result, a PPS mixture containing 55% of nonvolatile content (N.V.) was obtained.

Example/Production Example

Compression Step

Molding, grinding, and granulating were performed by a roll type compression granulator (roller compactor). Specifically, the PPS mixture obtained in Synthesis Example was placed in a hopper with a screw feeder of the roller compactor, the revolution speed of the screw feeder was adjusted to 63.5 rpm, the roll compression pressure was adjusted to five stages of 1.0, 1.2, 1.5, 1.8, and 2.0 ton/cm, and 30 kg of each plate-shaped compression-molded material was produced at a roll revolution speed of 15 rpm.

Step of Measuring True Specific Gravity

Next, the true specific gravity of the obtained compression-molded material was measured.

Grinding Step and Granulating Step

Subsequently, the amount of each compression-molded material was adjusted to three stages of 848.4, 732.3, and 654.7 kg/hr for treatment, and the compression-molded material was pulverized with a crusher. Thus, 10 kg of pulverized material was obtained.

Next, the pulverized material was granulated with a granulator, and sieved with a screen having an opening (adjusted to 5.0 mm) of the granulator. Thus, each granulated material was obtained.

Step of Measuring Bulk Specific Gravity

Subsequently, 10 kg of each of the obtained granulated materials was prepared, and the bulk density thereof was measured.

TABLE 1

| | True specific gravity g/cc | Bulk density g/cm$^3$ |
|---|---|---|
| Granulated material 1 | 1.10 | 0.482 |
| Granulated material 2 | 1.10 | 0.575 |
| Granulated material 3 | 1.10 | 0.503 |
| Granulated material 4 | 1.12 | 0.485 |
| Granulated material 5 | 1.12 | 0.573 |
| Granulated material 6 | 1.12 | 0.507 |
| Granulated material 7 | 1.15 | 0.488 |
| Granulated material 8 | 1.15 | 0.573 |
| Granulated material 9 | 1.15 | 0.501 |
| Granulated material 10 | 1.18 | 0.498 |
| Granulated material 11 | 1.18 | 0.593 |
| Granulated material 12 | 1.18 | 0.523 |
| Granulated material 13 | 1.26 | 0.509 |
| Granulated material 14 | 1.26 | 0.603 |
| Granulated material 15 | 1.26 | 0.534 |

Example 1

(Oxidative Crosslinking Step)

5 kg of each of the granulated materials 1, 2, and 3 was prepared from the thus obtained granulated materials such that the true specific gravity was constant, then placed in a box type dryer preheated to 150° C., and subjected to a heat treatment while air was sent at 2 L/min. The temperature was controlled such that the inner temperature of a heat treatment device was 250° C. After the granulated materials were held for 0, 2, 4, and 6 hours, the oxidatively crosslinked granulated materials were each obtained. The melt viscosity of each of the oxidatively crosslinked granulated materials was measured. The results are shown in Table 2.

Example 2

Each of oxidatively crosslinked granulated materials was obtained in the same manner as in Example 1 except that "the granulated materials 4, 5, and 6" were used instead of "the granulated materials 1, 2, and 3" in Example 1. The melt viscosity of each of the oxidatively crosslinked granulated materials was measured. The results are shown in Table 2.

Example 3

Each of oxidatively crosslinked granulated materials was obtained in the same manner as in Example 1 except that "the granulated materials 7, 8, and 9" were used instead of "the granulated materials 1, 2, and 3" in Example 1. The melt viscosity of each of the oxidatively crosslinked granulated materials was measured. The results are shown in Table 2.

Example 4

Each of oxidatively crosslinked granulated materials was obtained in the same manner as in Example 1 except that "the granulated materials 10, 11, and 12" were used instead of "the granulated materials 1, 2, and 3" in Example 1. The melt viscosity of each of the oxidatively crosslinked granulated materials was measured. The results are shown in Table 2.

Example 5

Each of oxidatively crosslinked granulated materials was obtained in the same manner as in Example 1 except that "the granulated materials 13, 14, and 15" were used instead of "the granulated materials 1, 2, and 3" in Example 1. The melt viscosity of each of the oxidatively crosslinked granulated materials was measured. The results are shown in Table 2.

TABLE 2

| | | Melt viscosity (Pa s) | | | |
|---|---|---|---|---|---|
| | | 0-Hour heat treatment | 2-Hour heat treatment | 4-Hour heat treatment | 6-Hour heat treatment |
| Example 1 | Granulated material 1 | 41.38 | 94.21 | 120.3 | 150.9 |
| | Granulated material 2 | 42.91 | 92.35 | 119.8 | 149.9 |
| | Granulated material 3 | 41.88 | 96.42 | 121.4 | 151.9 |
| Example 2 | Granulated material 4 | 40.01 | 90.24 | 115.5 | 147.4 |
| | Granulated material 5 | 41.55 | 90.23 | 114.9 | 146.2 |
| | Granulated material 6 | 41.79 | 91.02 | 116.5 | 147.8 |
| Example 3 | Granulated material 7 | 41.09 | 87.43 | 113.5 | 141.1 |
| | Granulated material 8 | 42.47 | 86.09 | 112.4 | 140.3 |
| | Granulated material 9 | 40.22 | 89.01 | 115.1 | 142.8 |
| Example 4 | Granulated material 10 | 42.49 | 85.69 | 109.5 | 137.7 |
| | Granulated material 11 | 43.78 | 86.24 | 107.5 | 136.8 |
| | Granulated material 12 | 40.96 | 84.24 | 108.7 | 136.4 |
| Example 5 | Granulated material 13 | 39.98 | 62.21 | 87.4 | 100.3 |
| | Granulated material 14 | 38.44 | 61.78 | 90.7 | 102.6 |
| | Granulated material 15 | 38.83 | 63.51 | 89.9 | 100.9 |

Comparative Example 1

(Oxidative Crosslinking Step)

5 kg of each of the granulated materials 1, 4, and 7 was prepared from the thus obtained granulated materials such that the bulk density was constant, then placed in a box type dryer preheated to 150° C., and subjected to a heat treatment while air was sent at 2 L/min. The temperature was controlled such that the inner temperature of a heat treatment device was 250° C. After the granulated materials were held for 0, 2, 4, and 6 hours, the oxidatively crosslinked granulated materials were each obtained. The melt viscosity of each of the oxidatively crosslinked granulated materials was measured. The results are shown in Table 3.

Comparative Example 2

Each of oxidatively crosslinked granulated materials was obtained in the same manner as in Example 1 except that "the granulated materials 2, 5, and 8" were used instead of "the granulated materials 1, 4, and 7" in Comparative Example 1. The melt viscosity of each of the oxidatively crosslinked granulated materials was measured. The results are shown in Table 3.

Comparative Example 3

Each of oxidatively crosslinked granulated materials was obtained in the same manner as in Example 1 except that "the granulated materials 3, 6, and 9" were used instead of "the granulated materials 1, 4, and 7" in Comparative Example 1. The melt viscosity of each of the oxidatively crosslinked granulated materials was measured. The results are shown in Table 3.

TABLE 3

| | | Melt viscosity (Pa S) | | | |
|---|---|---|---|---|---|
| | | 0-Hour heat treatment | 2-Hour heat treatment | 4-Hour heat treatment | 6-Hour heat treatment |
| Comparative Example 1 | Granulated material 1 | 41.24 | 94.53 | 120.7 | 150.5 |
| | Granulated material 4 | 40.34 | 90.82 | 115.3 | 147.7 |
| | Granulated material 7 | 41.21 | 87.19 | 113.4 | 141.3 |
| Comparative Example 2 | Granulated material 2 | 42.93 | 92.27 | 119.6 | 149.4 |
| | Granulated material 5 | 41.73 | 90.43 | 114.6 | 146.3 |
| | Granulated material 8 | 42.27 | 86.46 | 112.3 | 140.5 |
| Comparative Example 3 | Granulated material 3 | 41.90 | 96.58 | 121.7 | 151.6 |
| | Granulated material 6 | 41.61 | 91.55 | 116.7 | 147.6 |
| | Granulated material 9 | 40.45 | 89.67 | 115.3 | 142.9 |

As clear from the results, a crosslinked PPS having a reduced difference in melt viscosity is more likely to be obtained from the plate-shaped compression-molded material having a constant true specific gravity than the granulated material having a constant bulk density regardless of the heat treatment time. Therefore, it is clear that a progression state of a crosslinking reaction and the melt viscosity can be more accurately controlled than the bulk specific gravity that varies depending on the particle diameter of the granulated material and the ratio of gaps between the granulated materials.

As clear from the results, a crosslinked PPS having a reduced difference in melt viscosity and high melt viscosity is also likely to be obtained when the true specific gravity of the plate-shaped compression-molded material is within the range of 1.10 to 1.26. Furthermore, when the true specific gravity of the plate-shaped is within the range of 1.10 to 1.18, the crosslinking reaction can be efficiently promoted, and the melt viscosity can be increased in a short time.

Each of measurements was performed as follows.

(Measurement Example) Measurement of True Specific Gravity

For the obtained compression-molded material (200 g), the true specific gravity of the compression-molded material was measured with an electronic hydrometer ("MDS-300" manufactured by Alfa Mirage Co., Ltd.) in accordance with the principle of Archimedes method.

(Measurement Example) Measurement of Bulk Density

A container having a constant volume was filled with the granulated material so as to level the surface of the granulated material, and a lid was put. The weight of the granulated material was measured with an electronic meter, and then divided by the volume to calculate a bulk density (g/cm3).

(Measurement Example) Measurement of Melt Viscosity

The oxidatively crosslinked granulated material PPS was held under conditions including a temperature of 300° C., a load of $1.96\times10^6$ Pa, and L/D=10 (mm)/1 (mm) for 6 minutes, and the melt viscosity at 300° C. was measured with a flow tester CFT-500D (manufactured by Shimadzu Corporation).

The invention claimed is:

1. A method for producing a crosslinked polyarylene sulfide, the method comprising steps of:
- compression-molding an uncrosslinked polyarylene sulfide in a powder form to obtain a compression-molded material;
- measuring a true specific gravity of the compression-molded material;
- grinding the compression-molded product having a specific range of true specific gravity to obtain a pulverized material;
- granulating the pulverized material to obtain a granulated material; and
- oxidatively crosslinking the granulated material obtained in the above step, wherein the specific range of true specific gravity is within a range of 1.10 to 1.30.

2. A method for producing a crosslinked polyarylene sulfide, the method comprising steps of:
- compression-molding an uncrosslinked polyarylene sulfide in a powder form to obtain a compression-molded material;
- measuring a true specific gravity of the compression-molded material;
- grinding the compression-molded product having a specific range of true specific gravity to obtain a pulverized material;
- granulating the pulverized material to obtain a granulated material; and
- oxidatively crosslinking the granulated material obtained in the above step, wherein a shape of the granulated material is amorphous, and wherein the specific range of true specific gravity is within a range of 1.10 to 1.30.

3. A method for producing a resin composition, the method comprising steps of:
- producing a crosslinked polyarylene sulfide produced by the method according to claim 1; and
- melt-kneading the obtained crosslinked polyarylene sulfide with another component.

4. A method for producing a resin composition, the method comprising steps of:
- producing a crosslinked polyarylene sulfide produced by the method according to claim 2; and
- melt-kneading the obtained crosslinked polyarylene sulfide with another component.

5. A method for producing a molded article, the method comprising steps of:
- producing a resin composition by the method according to claim 3; and
- melt-molding the obtained resin composition.

6. A method for producing a molded article, the method comprising steps of:
- producing a resin composition by the method according to claim 4; and
- melt-molding the obtained resin composition.

* * * * *